United States Patent [19]

Kephart

[11] Patent Number: 5,452,442
[45] Date of Patent: Sep. 19, 1995

[54] METHODS AND APPARATUS FOR EVALUATING AND EXTRACTING SIGNATURES OF COMPUTER VIRUSES AND OTHER UNDESIRABLE SOFTWARE ENTITIES

[75] Inventor: Jeffrey O. Kephart, Yorktown Heights, N.Y.

[73] Assignee: International Business Machines Corporation, Armonk, N.Y.

[21] Appl. No.: 424,584

[22] Filed: Apr. 14, 1995

Related U.S. Application Data

[63] Continuation of Ser. No. 4,871, Jan. 19, 1993, abandoned.

[51] Int. Cl.$^6$ .............................................. G06F 11/00
[52] U.S. Cl. .................................... 395/183.14; 380/4
[58] Field of Search ................. 395/575; 371/19, 16.5, 371/11.2, 6.2; 380/3, 4

[56]    References Cited

U.S. PATENT DOCUMENTS

| | | | |
|---|---|---|---|
| 5,062,045 | 10/1991 | Janis et al. | 371/16.5 |
| 5,084,816 | 1/1992 | Boese et al. | 395/575 |
| 5,121,345 | 1/1992 | Lentz | 364/550 |
| 5,200,958 | 4/1993 | Hamilton et al. | 371/16.5 |
| 5,218,605 | 1/1993 | Low et al. | 371/19 |
| 5,255,208 | 10/1993 | Thakore et al. | 371/16.5 |
| 5,278,901 | 1/1994 | Shieh et al. | 380/4 |
| 5,291,590 | 3/1994 | Ohnishi et al. | 371/16.5 |
| 5,297,150 | 3/1994 | Clark | 371/19 |
| 5,319,776 | 6/1994 | Hile et al. | 395/575 |

OTHER PUBLICATIONS

Qasem et al "AI Trends in Virus Control" 1991 IEEE Proc. of South Eastcon pp. 99–103 vol. 1.
Crocker et al "A Proposal for a Verification-Based Virus Filler" 1989 IEEE Symposium Security & Privacy pp. 319–324.
Kephart et al "Directed Graph Epidemiological Module of Computer Viruses" 1991 IEEE Computer Society Symposium on Research in Security & Privacy pp. 343–359.
Kumar et al "A Generic Virus Scanner in C++" 1992 8th Ann. Computer Security Applications Proceedings pp. 210–219.
Shoutkov et al "Computer Viruses: Ways of Reproduction in MS DOS" 25th Ann. 1991 IEEE International Carnahan Conf. on Security Tech. pp.: 168–176.

(List continued on next page.)

Primary Examiner—Robert W. Beausoliel, Jr.
Assistant Examiner—Joseph E. Palys
Attorney, Agent, or Firm—Perman & Green

[57]    ABSTRACT

A method, and apparatus for accomplishing the method, to extract and/or evaluate a signature of a computer virus or other undesirable software entity. The method includes a first step of inputting to a digital data processor at least one portion of a undesirable software entity, the at least one portion including a sequence of bytes of the undesirable software entity that is likely to remain substantially invariant from one instance of that entity to another instance, and it is from this portion or portions that candidate computer virus signatures are drawn. A second step constructs a list of unique n-grams from the sequence of bytes, each of the unique n-grams being comprised of from one to a specified maximum number of sequential bytes of the sequence of bytes. A third step estimates, for each of the unique n-grams, a probability of an occurrence of a unique n-gram within sequences of bytes obtained from a corpus of computer programs that are typically executed upon the digital data processor. For each candidate signature that is comprised of one or more of the unique n-grams, a fourth step estimates a probability of an occurrence of the candidate virus signature within the sequences of bytes obtained from the corpus. A fifth step accepts the candidate signature as a valid signature if the estimated probability of the occurrence of the candidate virus signature is less than a threshold probability. The threshold probabilities have values selected to reduce the possibility of an occurrence of a false positive indication during the subsequent use of the valid virus signature by a virus scanner.

34 Claims, 4 Drawing Sheets

OTHER PUBLICATIONS

S. W. Shieh et al. "A Pattern-Oriented Intrusion-Detection Model and its Applications", Proceedings of the 1991 IEEE Computer Society Symposium on Research and Privacy, pp. 327–342.

H. S. Javitz et al. "The SRI IDES Statistical Anomaly Detector", Proceedings of the 1991 IEEE Computer Symposium on Research in Security and Privacy, pp. 316–326.

W. Arnold et al. "System for Detecting Undesired Alteration of Software", IBM TDB, vol. 32, No. 11, Apr. 1990, pp. 48–50.

S. M. Katz, "Estimation of Probabilities from Sparse Data for the Language Model Component of a Speech Recognizer", IEEE Trans. ASSP-35, No. 3, Mar. 1987, pp. 400–401.

F. Cohen, A Short Course on Computer Viruses, ASP Press, Pittsburg, 1990, pp. 9–15.

METHODS AND APPARATUS FOR EVALUATING AND EXTRACTING SIGNATURES OF COMPUTER VIRUSES AND OTHER UNDESIRABLE SOFTWARE ENTITIES

This is a continuation of application Ser. No. 08/004,871 filed on Jan. 19, 1993, now abandoned.

FIELD OF THE INVENTION

This invention relates generally to digital data processors and, in particular, to methods and apparatus for providing computational integrity for digital data processors.

BACKGROUND OF THE INVENTION

A computer virus has been defined by Frederick B. Cohen as a program that can infect other programs by modifying them to include a, possibly evolved, version of itself (A Short Course on Computer Viruses, page 11).

As employed herein, a computer virus is considered to include an executable assemblage of computer instructions or code that is capable of attaching itself to a computer program. The subsequent execution of the viral code may have detrimental effects upon the operation of the computer that hosts the virus. Some viruses have an ability to modify their constituent code, thereby complicating the task of identifying and removing the virus.

Another type of undesirable software entity is known as a "Trojan Horse". A Trojan Horse is a block of undesired code that is intentionally hidden within a block of desirable code.

A widely-used method for the detection of computer viruses and other undesirable software entities is known as a scanner. A scanner searches through executable files, boot records, memory, and any other areas that might harbor executable code, for the presence of known undesirable software entities. Typically, a human expert examines a particular undesirable software entity in detail and then uses the acquired information to create a method for detecting it wherever it might occur. In the case of computer viruses, Trojan Horses, and certain other types of undesirable software entities, the detection method that is typically used is to search for the presence of one or more short sequences of bytes, referred to as signatures, which occur in that entity. The signature(s) must be chosen with care such that, when used in conjunction with a suitable scanner, they are highly likely to discover the entity if it is present, but seldom give a false alarm, known as a false positive. The requirement of a low false positive rate amounts to requiring that the signature(s) be unlikely to appear in programs that are normally executed on the computer. Typically, if the entity is in the form of binary machine code, a human expert selects signatures by transforming the binary machine code into a human-readable format, such as assembler code, and then analyzes the human-readable code. In the case where that entity is a computer virus, the expert typically discards portions of the code which have a reasonable likelihood of varying substantially from one instance of the virus to another. Then, the expert selects one or more sections of the entity's code which appear to be unlikely to appear in normal, legitimate programs, and identifies the corresponding bytes in the binary machine code so as to produce the signature(s). The expert may also be influenced in his or her choice by sequences of instructions that appear to be typical of the type of entity in question, be it a computer virus, Trojan horse, or some other type of undesirable software entity.

However, the accelerating rate at which new viruses, and new variations on previously-known viruses, are appearing creates a heavy burden for human experts. Furthermore, the efficacy of virus scanning is impaired by the time delay between when a virus is first introduced into the world's computer population and when a signature capable of recognizing the virus is distributed to an appreciable fraction of that population.

It is thus an object of this invention to provide an automatic computer implemented procedure for extracting and evaluating computer virus signatures.

It is further object of this invention to provide a statistical computer implemented technique for automatically extracting signatures from the machine code of a virus and for evaluating the probable effectiveness of the extracted signatures for identifying a subsequent instance of the virus.

It is another object of this invention to provide a statistical computer implemented technique for automatically evaluating computer virus signatures that have been preselected by a manual or other procedure.

SUMMARY OF THE INVENTION

The foregoing and other problems are overcome and the objects of the invention are realized by a statistical method for automatically extracting signatures from the machine code of a computer virus and/or for evaluating viral signatures that have previously been selected by some other means. The resulting signatures are highly unlikely to give rise to false positives, and are sufficiently flexible to capture new variations of a previously-known virus.

The computer virus extractor and evaluator that operates in accordance with this invention is robust to variations in the viral code, allowing some variation of the code even within the portion of the virus that contains the signature. This is achieved by recognizing byte strings that nearly, but not exactly, match a given signature. In that only a certain amount of mismatch between a string of bytes and a signature can be tolerated, so as to prevent the generation of false positives; the user is given a capability to quantify a tradeoff between robustness and recognition accuracy.

In accordance with the invention there is provided a method for operating a digital data processor to obtain a valid signature of a computer virus. The method includes a first step of inputting to the digital data processor at least one portion of a computer virus, the at least one portion including a sequence of bytes of the computer virus that is likely to remain substantially invariant from one instance of the computer virus to another instance, and it is from this portion or portions that candidate computer virus signatures are drawn. A second step constructs, with the digital data processor, a list of unique n-grams from the sequence of bytes, each of the unique n-grams being comprised of from one to a chosen maximal number of sequential bytes. A third step estimates, for each of the unique n-grams, a probability of an occurrence of a unique n-gram within sequences of bytes obtained from a plurality of computer programs, referred to herein as a corpus of computer programs, that are typically executed upon the digital data processor.

For each candidate virus signature, which is comprised of one or more of the unique n-grams, a fourth step estimates a probability of an occurrence of the candidate virus signature within the sequences of bytes obtained from the corpus, referred to herein as the "false positive probability" for the candidate signature. A fifth step selects one or more of the "best" candidate signatures as valid, where the merit of a signature increases with decreasing false positive probability, and may also depend on other criteria. A signature can only be accepted as valid if its estimated false positive probability is less than a threshold probability. The threshold probability is chosen such that it is low enough to reject signatures which might produce too many false positives, but high enough to ensure that at least some candidate signatures will be accepted.

When operating in a computer virus signature evaluation mode, the step of inputting includes a step of inputting one or more candidate virus signatures. Each of the one or more candidate virus signatures includes at least one portion of the computer virus, the at least one portion including a sequence of bytes representing machine code instructions of the computer virus.

When operating in a computer virus signature extraction mode, the step of inputting includes the initial steps of generating at least one instance of the computer virus; and evaluating the at least one instance to identify at least one portion that remains invariant from one instance of the computer virus to another instance of the computer virus. Typically, the invariant portion includes a sequence of bytes that represent machine code instructions of the computer virus.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
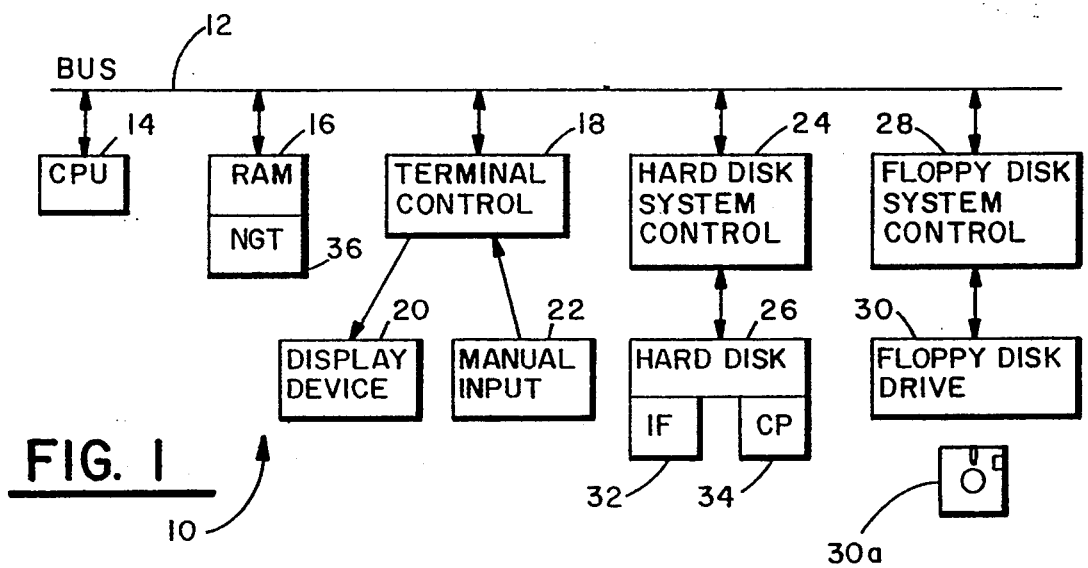
FIG. 1 is a block diagram of a computer system that is suitable for use in practicing the invention.

FIG. 1 is a block diagram of a data processing system 10 that is suitable for practicing the teaching of the invention. A bus 12 is comprised of a plurality of signal lines for conveying addresses, data, and controls between a Central Processing Unit 14 and a number of other system bus units. A RAM 16 is coupled to the system bus 12 and provides program instruction storage and working memory for the CPU 12. A terminal control subsystem 18 is coupled to the system bus 12 and provides outputs to a display device 20, typically a CRT monitor, and receives inputs from a manual input device 22, typically a keyboard. Manual input may also be provided from a pointing device, such as a mouse. A hard disk control subsystem 24 bidirectionally couples a rotating fixed disk, or hard disk 26, to the system bus 12. The control 24 and hard disk 26 provide mass storage for CPU instructions and data. A floppy disk control subsystem 28 bidirectionally couples one or more floppy disk drives 30 to the system bus 12. The floppy disk drive 30 works in conjunction with a removable floppy diskette 30a.

The components illustrated in FIG. 1 may be embodied within a personal computer, a portable computer, a workstation, a minicomputer, a main frame computer, or a supercomputer. As such, the details of the physical embodiment of the data processing system 10, such as the structure of the bus 12 or the number of CPUs 14 that are coupled to the bus, is not crucial to the operation of the invention, and is not described in further detail below.

Figure 2:
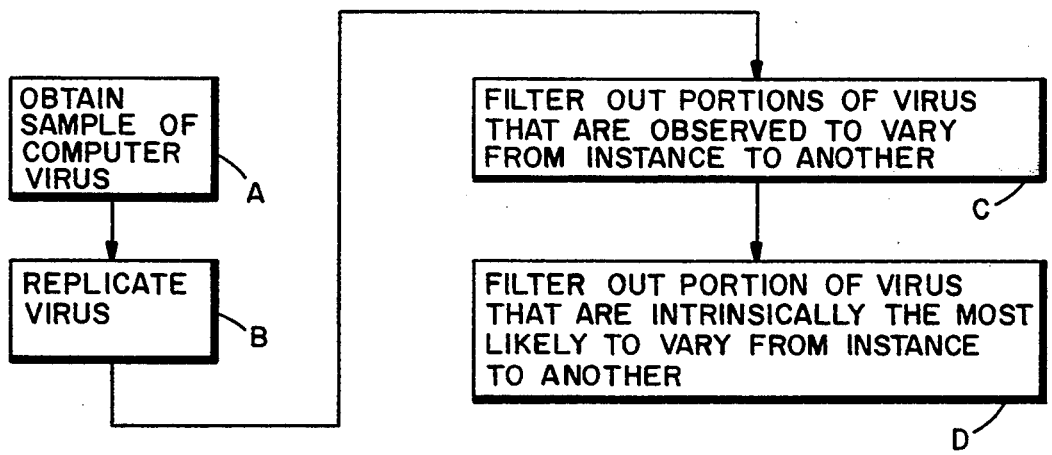
FIG. 2 is a flow chart depicting a preprocessing method for use in a signature extraction mode of operation.

FIG. 2 is a flow chart that illustrates a preprocessing step that is executed before the extraction of the signature of a computer virus by the method and apparatus of the invention. The goal of this preprocessing step is to identify sections of the computer virus which are likely to remain invariant from one instance of the computer virus to another instance. Thus, any candidate signature drawn from these sections will be likely to identify the virus whenever it is present.

Figure 4:
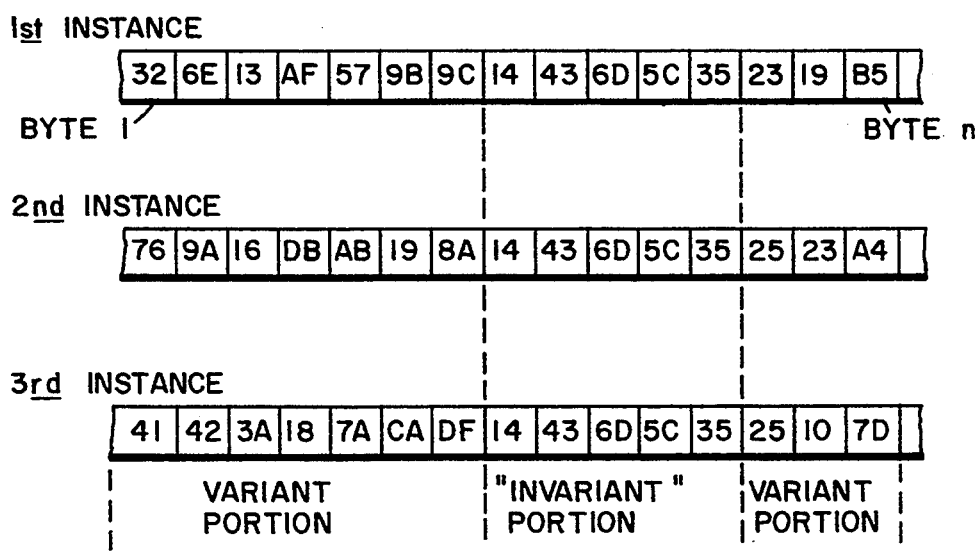
FIG. 4 illustrates exemplary portions of three instances of a computer virus, the three portions each including an invariable portion and variable portions.

At Block A, one or more samples of a computer virus, typically imbedded in a host (infected) executable program, are provided. Optionally, at Block B, one or more additional samples of the virus are generated by running the infected host program and deliberately trying to infect specially-designated victim programs (referred to as decoys). Preferably, Block B is executed on an isolated system dedicated to this purpose, so as to prevent this procedure from inadvertently spreading the virus. Alternatively, Block B may also be executed in a virtual machine that contains a model of the register, memory and file system architecture of the host computer. If Block B has generated additional samples of the virus, or if several samples were provided at Block A, then at Block C sections of the virus which have been observed to vary among different instances of the virus are filtered out. This procedure is illustrated in FIG. 4, in which the variant and "invariant" portions of a virus are identified by comparing three instances of it. In FIG. 4, each byte is shown expressed in a hexadecimal representation, and an "invariant" portion is identified. The length of the "invariant" sequence of bytes is exemplary. In practice, "invariant" sequences of bytes are often considerably longer than five bytes, and more than one such portion typically appears within the virus. Any "invariant" sequences of bytes identified by Block C are marked as such, and passed to Block D for further processing. If there are no substantially similar areas, this may indicate the presence of a relatively sophisticated self-altering virus, and a warning message should be generated and displayed to the user. If Block B is not employed, and only one sample is provided at Block A, then there is no work for Block C to do, and the entire virus is marked as "invariant" and passed to Block D.

Regardless of whether Blocks B and C have been employed, there are at Block D one or more sections of the virus which have been tentatively classified as being invariant. However, even if Blocks B and C have been employed, it is possible that not all of the potential variation has been captured. In Block D, heuristics are employed to identify portions of the "invariant" sections of the virus which, by their nature, are unlikely to vary from one instance of the virus to another. In particular, "code" portions of the virus which represent machine instructions (with the possible exception of bytes representing addresses) are typically invariant. "Data" portions of the virus, which for example could represent numerical constants, character strings, screen images, work areas for computations, addresses, etc., are often invariant as well, but are much more vulnerable to modifications by the virus itself when it replicates itself, or by humans who intentionally modify viruses so as to help them elude virus scanners.

Referring again to FIG. 2, at Block D the "invariant" "code" and "invariant" "data" portions are segregated from one another, and only the "invariant" "code" portions are retained for further processing. At this point there exists one or more sequences of invariant machine code bytes from which viral signatures can be selected. The set of candidate viral signatures are all possible contiguous blocks of S bytes found in these byte sequences, where S is a signature length specified by the user or determined by the method of the invention. Typically, S has a value in the range of approximately 12 bytes to 36 bytes.

If previously-chosen signatures are being evaluated, then the set of candidate signatures contains the previously-chosen signatures. In either the case of extraction or evaluation, there may be several viruses (or viral signatures) of interest. As such, a record is maintained of which candidate signatures belong to each virus.

In general, the technique described below in relationship to the flow chart of FIG. 3 estimates the probability that each of the candidate signatures will match a randomly-chosen block of bytes in the machine code of a randomly-chosen program, either exactly or with some specified number or pattern of mismatches. In the case of extraction, one or more signatures are selected that have an estimated "false-positive" probability which is among the lowest of all the candidate signatures, and which is also less than a predetermined threshold. Other selection criteria may be applied as well. In the case of evaluation, a signature is approved for subsequent use if its estimated false-positive probability is less than the predetermined threshold. In that it is technically impossible to verify a signature against all programs that have ever been written or that ever will be written, the probability estimation is preferably based on a corpus of software programs in common use on the particular hardware and operating system on which the virus scanner is to be used. This corpus is used to extrapolate from a subset of the programs in existence to the much larger set of possible programs.

DESCRIPTION OF THE EXTRACTION-/EVALUATION PROCEDURE

In a first step, the user supplies either (a) a file containing a list of virus signatures to be evaluated or (b) one or more files, each containing one or more portions of invariant viral code from which one or more virus signatures are to be extracted. The input files (IFs 32 of FIG. 1) can be stored on either the hard disk 26 or the floppy disk 30a, either by manual input, copying of the files from other storage media, or by automatic creation of the files by other software programs that have previously executed on the same physical device.

Furthermore, there is provided the corpus of software programs in common use on the particular hardware and operating system targeted by the computer virus(es) of interest. For example, for viruses which affect IBM PCs and compatibles running DOS (disk operating system), the corpus includes a number of executable programs (typically stored as files with .COM and .EXE extensions). In the preferred embodiment of the invention, the corpus of programs (CP 34 of FIG. 1) is stored on a storage device, such as the hard disk 26, that is accessible by the computer system on which the method is executed. An alternative implementation, described in detail below, permits the corpus to be stored elsewhere. In this case, a file containing a properly digested version of the corpus is stored on a storage device which is accessible by the computer system on which the method is to be executed. This file is referred to as a table of n-gram probabilities, and is discussed in greater detail below.

Finally, the user causes the method described below to be executed on the data processing system 10, typically by issuing the appropriate command via the input device 22. A computer program that implements the method of the invention can also be stored on the hard disk 26 or the floppy disk 30a and, in response to the invocation of the program by the user, is loaded from disk to the RAM 16. The CPU 14 then executes the program. It may be necessary for the user to supply input parameters to the method by manual input of either the parameters themselves or the name of input files containing the parameters. These input parameters can include, by example, the before-mentioned predetermined threshold value for probability estimation and the file name(s) of the IF 32.

It should be realized that system 10 that executes the method of the invention need not be the same system for which one or more valid virus signatures are being generated for use by a virus scanner program.

Figure 3:
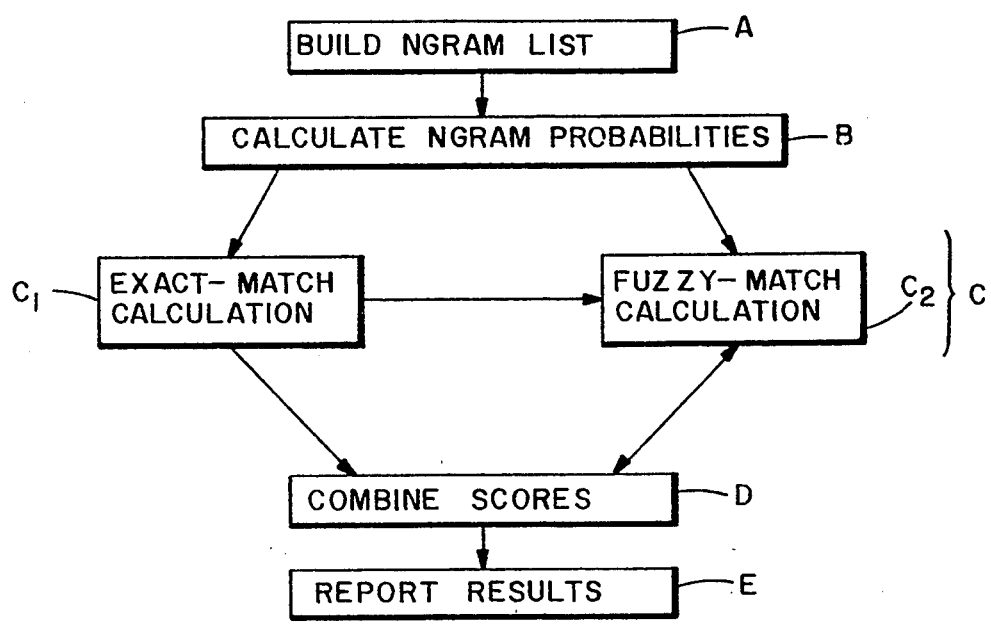
FIG. 3 is a flow chart that shows the operation of the statistically based computer virus signature extraction and evaluation method of the invention.

Reference is now made to FIG. 3 for a general description of the steps of the method of the invention.

At Block A, a list is formed of all n-grams, with $n \leq a$ selected maximum length value, that are contained in the IF 32 data. An n-gram is an instance of n consecutive bytes, where $n=1$ (uni-gram) to some arbitrarily large value. The IF 32 is comprised of sections of virus code, when executing in the extraction mode, or candidate signatures when executing in the evaluation mode. Whether the extraction or evaluation modes is to be executed can be governed by an input parameter, or decided automatically on the basis of the form of the IF 32.

At Block B the probabilities are estimated for all n-grams in the list of n-grams by tallying the number of instances of each n-gram in the CP 34 and using simple arithmetic calculations.

At Block $C_1$, for each candidate signature, an estimate is made of the probability of an exact match and-/or at Block $C_2$ the probability is estimated of a specified set of non-exact or "fuzzy" matches (e.g., matches to the signature or some contiguous fragment of it, given a specified number of mismatches).

At Block D, the estimated exact-match and fuzzy-match probabilities are combined to obtain an overall evaluation of each candidate signature.

At Block E, the method reports the outcome for some subset of the candidate signatures. The output report can be displayed on the display device 20 and/or stored in a file on the hard disk 26 or floppy disk 30a for subsequent review by an operator. The report can also be provide as an input to other software programs, such as virus scanners, which make use of the report.

The foregoing Blocks A-E are now described in greater detail.

BUILDING A LIST OF THE REQUIRED N-GRAMS (FIG. 3, Block A)

In the extraction mode, there are typically one or more sections of virus code (binary machine code) from each of one or more viruses. Although it is not essential, it is desirable to eliminate any large data areas from these sections, leaving only those portions which represent machine instructions. As was noted in the description of the flow chart of FIG. 2, this can be accomplished by a human expert or by some automatic procedure. The exact means by which the invariant, typically code, portions are obtained is not germane to the ensuing description of the invention.

One suitable procedure for extracting the n-grams and placing them into an n-gram table (NGT 36 of FIG. 1) is expressed in the following pseudo-code.

```
Procedure: Build_Ngram_List (Extraction Mode)
For each virus
    For each section of virus code
        For i=1 to length_of_section
            For n=1 to n_Max
                If (i+n-1 < length_of_section)
                    n-gram=bytes i through i+n-1 of section
                    If (n-gram is not in n-gram_table)
                        store n-gram in n-gram_table
```

The n-gram table 36 is maintained in, by example, the RAM memory 16 and/or in a file stored on the hard disk 26 or the floppy disk 30a. The term length_of_section is the length of a given section of virus code in bytes, and $n_{Max}$ is a chosen maximum length, in bytes, of the n-grams. Typical values for $n_{Max}$ are in the range of 3 to 8.

In the evaluation mode the procedure starts with a given list of candidate signatures, one or more for each virus. The list may have been generated by a human expert by any suitable procedure. In the evaluation mode, n-gram collection is conceptually the same as for the extraction mode, with each candidate signature being treated as if it were a section of viral code. One suitable procedure for extracting the n-grams and placing them into the n-gram table 36 is expressed in the following pseudo-code.

```
Procedure: Build_Ngram_List (Evaluation Mode)
For each virus
    For each candidate signature
        For i=1 to length_of_signature
            For n=1 to n_Max
                If (i+n-1<length_of_signature)
                    n-gram=bytes i through i+n-1 of
                    signature
                    If (n-gram valid and n-gram is not in
                        n-gram_table)
                        Store n-gram in n-gram_table
```

The only condition under which an n-gram is invalid is if it contains wildcards, wherein a wildcard is considered a don't-care byte or bytes. For example, if the $i^{th}$ byte in a signature is a wildcard, this indicates that any byte is considered to match the $i^{th}$ byte. Wildcards are included in some virus signatures to provide greater robustness to variations in the virus, as described below.

ESTIMATING THE N-GRAM PROBABILITIES FIG. 3, Block B)

Having obtained a list of all of the n-grams, the list being stored in the n-gram table 36, the next step estimates a probability for each n-gram to exactly match a sequence of n-bytes that are randomly chosen from the corpus. The extraction/evaluation procedure uses either of two estimation methods.

Estimation Method 1

A presently preferred approach to n-gram probability estimation searches the entire corpus of programs 34 for only those n-grams that are listed in the n-gram_table 36. This method tallies the frequency of occurrence of each n-gram within the corpus 34 and inserts the occurrence frequency into the n-gram_table 36.

More specifically, what follows is a method for collecting n-gram statistics:

(a) For each n-gram $B_1B_2 \ldots B_n$ in the n-gram_table 36, record $f(B_1B_2 \ldots B_n)$, the number of occurrences of the n-gram in the corpus 34 (this can be implemented efficiently using a hash table).

(b) Record also in the n-gram_table 36 the number of n-grams of length n, $T_n$.

For uni-grams (n=1), the estimated probability is simply taken to be the observed frequency: $p(B_1)=f(B_1)/T_1$. For $n \geq 2$, the estimated probability is given by a weighted average of the observed frequency and the probability calculated by combining together shorter n-grams. A preferred method used to combine two (n−1)-gram probabilities and an (n−2)-gram probability to form an n-gram probability is:

$$p(B_1B_2 \ldots B_n) = \frac{p(B_1B_2 \ldots B_{n-1})p(B_2B_3 \ldots B_n)}{p(B_2B_3 \ldots B_{n-1})} \quad (1)$$

Thus, the method for calculating n-gram probabilities is given by:

Procedure: Calculate n-grams $$p(B_1B_2 \ldots B_n) = a_{f(B_1B_2\ldots B_n)}\frac{f(B_1B_2 \ldots B_n)}{T_n} + \quad (2)$$

$$(1 - a_{f(B_1B_2\ldots B_n)})\frac{p(B_1B_2 \ldots B_{n-1})p(B_2B_3 \ldots B_n)}{p(B_2B_3 \ldots B_{n-1})}$$

where $a_f(B_1B_2 \ldots B_n)$ is a heuristic weighting function which depends upon how occurrences of $B_1B_2 \ldots B_n$ appear in the corpus of programs 34. The weighting function $a_m=0$ when $m=0$ and $a_m=1$ when $m \geq 1$ has been found to work well in practice. In order to apply Eq. 2 for n=2, the 0-gram probability is defined as unity. In practice, the uni-gram and bi-gram (n=1 and n=2, respectively) probabilities are tabulated first, and are then employed to determine the tri-gram (n=3) probabilities. Next, the bi-grams and tri-grams are used to determine the 4-gram probabilities, etc., until finally there is determined the $n_{Max}$-gram probabilities from the ($n_{Max}-1$)-gram and the ($n_{Max}-2$)-gram probabilities.

Estimation Method 2

Figure 6:
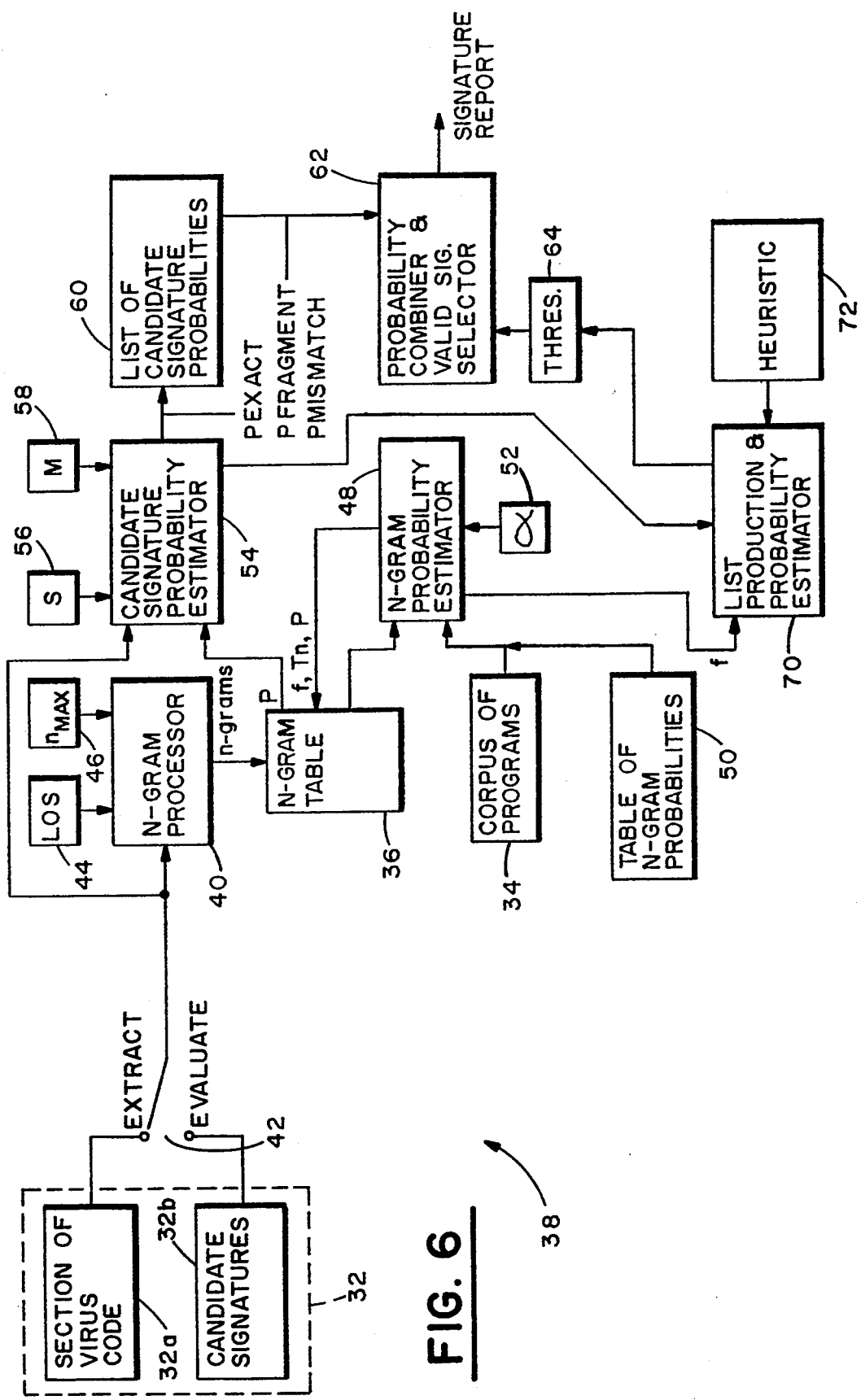
FIG. 6 is block diagram of a system suitable for executing the method of the invention.

A second approach consults a pre-computed table of n-gram probabilities 50, shown in FIG. 6, and places the results in the n-gram table. The pre-computed table is used for any set of viral code portions or candidate signatures, and is constructed by making a one-time pass through the corpus 34 to determine the number of times each n-gram appears in the corpus 34 (for each $n \leq n_{Max}$), and dividing by the total number of n-grams of length n in the corpus 34. However, the pre-computed table 50 could be infeasibly large if $n_{Max} > 2$, even if n-grams which never appear in the corpus are omitted.

One solution to this problem stores a chosen subset of the n-grams and fabricates the remainder from shorter n-grams. One suitable subset is the K most common n-grams. Another suitable subset is the set of n-grams whose measured frequencies deviate by more than a given amount from that estimated by combining, in accordance with Equation 1, two (n−1)-grams and an (n−2)-gram.

In the second case, Equation 1 is applied iteratively by first using uni-gram and bi-gram probabilities to estimate the tri-grams, then bi-grams and tri-grams to estimate the 4-grams, etc., until finally the $n_{Max}$-gram probabilities are estimated from the ($n_{Max}$−1)-gram and ($n_{Max}$−2)-gram probabilities. At each stage, only the n-grams whose frequencies are poorly estimated by Equation 1 are included in the pre-computed table 50. The amount of computation is substantial, but is only required to be performed once, with possible periodic updates to take into account additions to the corpus of popular new programs compiled with new compilers.

A presently preferred method for determining the contents of the pre-computed table 50 of n-gram probabilities includes the following steps.

1. Tally the number of occurrences (the absolute frequency) of all 1-gram and 2-grams in the corpus 34; divided by T_1 and T_2 respectively to obtain the relative frequency of each 1-gram and 2-gram. Store all 1-gram and 2-gram frequencies in the pre-computed n-gram table.
2. For k=3 to some chosen maximum k,
   Determine the relative frequency of each k-gram for which the first (k−1) bytes are a (k−1) gram in the pre-computed n-gram table. (This condition will hold for all 3-grams, but not necessarily for k>3).
   Divide this observed relative frequency by the estimated frequency obtained from Eq. 1 using (k−1) and (k−2) -grams.
   If the absolute value of the logarithm of this quantity exceeds some chosen threshold, store the k-gram and its measured absolute frequency in the pre-computed n-gram table 50.

It should be noted that this is but one of several suitable methods for deriving the contents of the pre-computed table 50 of n-gram probabilities.

In general, estimation method 1 requires less storage and is more accurate than estimation method 2, but can require considerably more time to execute in that the entire corpus is searched every time that new sections of viral code or candidate signatures are presented.

ESTIMATING THE CANDIDATE SIGNATURE PROBABILITIES (FIG. 3, Blocks C)

Depending upon the application, it may be desirable to estimate the probability of an exact match or a partial match (typically fragments or mismatches) between a candidate signature and some string of bytes in the corpus (or any statistically similar set of programs of comparable size). However, partial mismatch computations can be computationally expensive, and in the extraction mode the set of candidate signatures can be quite large. Therefore, depending upon the speed of the CPU 14, it may be desirable to employ only the exact-match probabilities to prune the set of candidate signatures. This is the reason for the arrow pointing from the exact-match calculation block ($C_1$) to the fuzzy-match calculation block ($C_2$). For example, the candidate signatures having the n lowest exact-match probabilities can be selected for further computation of fragment and mismatch probabilities.

In the evaluation mode, the list of candidate viral signatures is preexistent. A suitable procedure for probability estimation of each candidate signature is given by the following pseudo-code.

---
Procedure: X_Probability_Evaluation_Mode
For each virus
    For each signature=$B_1B_2 \ldots B_S$
        Store $p_x$ (signature) = X_Probability (signature)
--- where X denotes "Exact Match", "Fragment", "Mismatch", and possibly also some prepended qualifier describing alternate implementations of the indicated probability calculations, to be described further below.

In the extraction mode, the list of candidate signatures must be constructed from the sections of viral code. One suitable method selects some desired signature length S and treats each contiguous block of S bytes in each viral code section as a candidate. In this case, a suitable procedure for probability estimation of each candidate signature is given by the following pseudo-code.

---
Procedure: X_Probability_Extraction_Mode
For each virus
    For each section of virus code
        For i = 1 to (length-of-section-S+1)
            For j = 1 to S
                $B_j$ = byte i+j−1
            Candidate signature = $B_1B_2 \ldots B_s$
            Store $p_x$ (signature) = X_Probability($B_1 B_2 \ldots B_s$)
---

Alternatively, S may be adjusted to the shortest length that satisfies a user-specified probability threshold.

The problem of estimating the probability that a proposed signature will exactly match a string of bytes in the corpus is next discussed, followed by a discussion of two types of partial matches, i.e., fragments and mismatches.

Probability of an Exact Match to a Given Signature

In order to calculate the exact-match probability $P_{Exact\text{-}Match}$ (signature) for a given signature, it must first be determined whether any bytes should be replaced by wildcards. In some processor architectures, there are instructions which contain addresses that can potentially vary from one instance of a program (in this case a virus) to another. If it is intended to use the teaching of the invention in conjunction with a virus scanner that permits wildcards, these potentially variable bytes can be identified and replaced by wildcards. The positions of any wildcards that are already present, or that were introduced at this step, are used in the exact-match probability calculation. The following pseudo-code describes a suitable implementation for determining the exact match probability.

---
Procedure: Exact_Match_Probability (signature)
If desired, replace any potentially variable bytes in the signature with wildcards
W = number of wildcards in signature
Form list of wildcard positions: P = ($P_1, P_2 \ldots, P_w$); $P_i < P_j$ -continued

```
for i < j
P_Exact-Match(signature) =
    Calculate_Sequence_Probability(signature; P)
```

Calculate_Sequence_Probability(signature; P) is a procedure that estimates the probability $p(B_1B_2 \ldots B_S; P)$ of finding a byte-sequence $B_1B_2 \ldots B_S$ with wildcards in positions $P \equiv (P_1P_2 \ldots, P_w)$. The integers $P_i \leq S$ are in monotonically increasing order, and $0 \leq W$ = number of wildcards $\leq S$.

One presently preferred implementation, described in the following pseudo-code, segregates the signature into contiguous blocks of bytes containing no wildcards. The probabilities of these contiguous blocks are then multiplied to approximate the exact-match probability for the signature.

```
Procedure: Calculate_Sequence_Probability (byte-sequence; P)
P_o = -1
p_{k+1} = S + 1
p(byte-sequence;P) = 1
For j = 0 to K
    byte-block = bytes P_j+1 through P_{j+1}-1 in byte
        sequence
    p(byte-sequence;P) = p(byte-sequence;P) *
        Calculate_Block_Probability(byte-block)
```

Calculate_Block_Probability(byte-block) is a procedure that estimates the probability $p(B_1B_2 \ldots B_K)$ of a contiguous, wildcard-free block of bytes $B_1B_2 \ldots B_K$ in the corpus. A preferred implementation is as follows:

Procedure: Calculate_Block_Probability(byte-block)

$$p(\text{byte-block}) = \quad (3)$$

$$\begin{cases} p(B_1 \ldots B_K) & \text{if } K \leq n_{Max} \\ \dfrac{\sum_{i=1}^{K-n} \text{Max}+1 \, p(B_i \ldots B_{i+nMax-1})}{\sum_{i=2}^{K-n} \text{Max}+1 \, p(B_i \ldots B_{i+nMax-2})} & \text{if } K > n_{Max} \end{cases}$$

The condition $K > n_{Max}$ occurs when the length of the wildcard-free block exceeds the maximal size of the collected n-grams in the n_gram_table 36.

Fragments

In order to enable a virus scanner to detect a slightly-altered version of a known virus, some virus scanners alert the user when a contiguous block of F bytes in a signature of length S is found in the course of scanning. There are (S−F+1) possible fragments of this sort. Other criteria, such as requiring that the first few bytes of each fragment be less probable than a given threshold, can reduce the total number of fragments to a smaller subset of valid fragments. The quantity of interest in this case is the probability that none of the fragments in the subset will be found in the corpus, or in a statistically-similar set of programs of comparable size. It can be shown that a readily-computed upper bound on this probability is the sum of the probabilities of the individual fragments. The use of this estimated upper bound, rather than an estimated probability, introduces some inaccuracy, but is generally adequate and is much less computationally expensive than a more exact computation.

Thus, given a particular candidate signature $B_1B_2 \ldots B_S$ the following pseudo-code provides a procedure for estimating the overall fragment probability (actually its upper bound):

```
Procedure: Fragment_Probability (signature)
If desired, replace any potentially variable bytes in
signature with wildcards.
p_Fragment(signature) = 0
For i = 1 to (S−F+1)
    fragment = bytes i through (i+F−1)
    If (fragment is valid fragment)
        W = number of wildcards in fragment
        Form list of wildcard positions in fragment:
            P = (P_1,P_2 ... ,P_w); P_i < P_j for i < j
        p(fragment) =
            Calculate_Sequence_Probability(fragment; P)
        p_Fragment(signature) = p_Fragment(signature) +
            p(fragment)
```

The above procedure is similar to that given for exact matches, except that there is an iteration over all fragments in the desired subset of possible fragments, and the overall fragment probability is an accumulation of the individual fragment probabilities.

Mismatches

A further method for detecting altered versions of a known virus alerts the user when a string of bytes approximately matches the signature. More precisely, all but at most M bytes in the string match the byte in the corresponding position in the signature. In this case, an estimate is required of the probability of finding a signature with M or fewer mismatches to the candidate signature $B_1B_2 \ldots B_S$. A reasonable approximation to the M-mismatch probability is obtained by adding the probabilities of all of the combinatorial number of possible mismatch positions. For example, the probability of at most two mismatched bytes in a given string of S bytes (none of which are wildcards) approximated by:

$$p_{M=2}(B_1B_2 \ldots B_S) \approx \quad (4)$$

$$\sum_{i=1}^{S-1} \sum_{j=i+1}^{S} p(\ldots B_{i-1}X_iB_{i+1} \ldots B_{j-1}X_jB_{j+1} \ldots)$$

where $X_i$ and $X_j$ represent what are referred to herein as variable-position wildcards in positions i and j, respectively. The sums run over all possible positions of i and j.

If there are already wildcards in the candidate signature $B_1B_2 \ldots B_S$ (which are referred to herein as fixed-position wildcards), the situation is slightly more complex. If the number of fixed-position wildcards, W, exceeds the number of allowed mismatches, M, the signature is invalid for M mismatches, and no further computation is necessary. If W=M, the M-mismatch probability is identical to the exact-match probability, the estimation of which has already been described. If W<M, then M−W variable-position wildcards are added to the W fixed-position wildcards. The probabilities of all of the combinatorial number of possible sets of M−W variable positions are added to obtain the M-mismatch probability. The following pseudo-code provides a presently preferred procedure for estimating the overall mismatch probability, which is designated $P_{Mismatch}(B_1B_2 \ldots B_S;M)$.

```
Procedure: Mismatch_Probability (signature; M)
If desired, replace any potentially variable bytes in
signature with wildcards.
W = number of wildcards
```

-continued

```
m = M−W
If (M<0)
    Error: Stop -- number of wildcards exceeds allowed
        mismatches
Else if (m=0)
    For i=1 to S+1
        For j=i to S+1
            Q(0,i,j)= Exact_Match_Probability(B_i
                B_{i+1} ... B_{j−1})
    p_{Mismatch}(signature; M)=Q(0,1,S+1)
Else if (m>0)
    For i=1 to S+1−m
        For j=i+m to S+1
            Q(m,i,j)=0
            For k=i to k=j−m
                If (k is not the index of any
                    fixed-position wildcard)
                    Q(m,i,j)= Q(m,i,j) + Q(0,i,k)*
                        Q(m−1,k+1,j)
    p_{Mismatch}(signature;M)=Q(m,1,S+1)
```

It should be noted that when m=0, the procedure Exact_Match_Probability is used to calculate exact-match probabilities $Q(0,i,j)$ of all relevant sub-sequences of the candidate signature. Only $Q(0,1,S+1)$, that is, the probability of the subsequence which consists of the entire signature, is required. However, the other probabilities $Q(0,i,j)$ for $i \neq 1$ and $j \neq S+1$ are useful to calculate and retain for use in calculations with $m > 0$.

When the number of variable-position wildcards m is non-zero, the probabilities $Q(m,i,j)$ of all relevant sub-sequences of the signature with m variable-position wildcards can be expressed in terms of probabilities of sub-sequences of the signature with $m-1$, and with zero variable-position wildcards ($Q(m-1,k+1,j)$ and $Q(0,i,k)$ for all k for which the $k^{th}$ byte is not a fixed-position wildcard). Again, only the probability $Q(m,1,s+1)$ is needed at this stage, but the other probabilities $Q(m,i,j)$ for $i \neq 1$ and $j \neq S+1$ are useful to calculate and retain for use in calculations with m replaced by $m+1$.

In practice, it would be most efficient to invoke the procedure Mismatch_Probability for M=W first. Note that this yields the exact-match probability. Then, one would invoke Mismatch_Probability for M=W+1, then M=W+2, etc., up to some value of M given by a predetermined function of the signature length S, a predetermined function of $p_{Mismatch}$(signature;M), or some other criterion.

COMBINING AND REPORTING THE RESULTS (FIG. 3, Blocks D, E)

In practice, the probability estimates for exact matches, fragments, and mismatches are generally somewhat inaccurate on an absolute scale, but for sufficiently large $n_{Max}$ the correlation between the probability estimates and the actual probabilities is good.

Depending upon the application, there are a number of possible ways in which the results of the various probability estimates can be combined into a final, useable result. One method assigns a score to a signature based on some combination of the three probabilities (and possibly the number of mismatches M as well), and then employs a predetermined threshold to accept or reject that signature.

If the signature is to be used in conjunction with a virus scanner that only permits exact matches, a suitable choice for the score would be just the exact-match probability. The signature is then accepted if its score is below some specified threshold and rejected otherwise.

If the virus scanner permits fragments and mismatches, a suitable choice for the score is the sum of the fragment and mismatch probabilities. This results in a slight overestimate of the probability of either a fragment or a mismatch, since the probabilities are not completely independent, but for the purposes of this invention this technique provides a reasonable approximation. Again, a threshold may be used to reject or accept the signature.

More sophisticated strategies are also within the scope of the teaching of this invention. For example, the fragment and M-mismatch probabilities are separately compared to a fragment threshold and to a M-mismatch threshold. If the fragment score is acceptable but the M-mismatch score is not, the virus scanner may allow matches on fragments but not M-mismatches, and vice versa.

Furthermore, instead of rejecting the M-mismatch score outright for some predetermined value of M, it is also within the scope of the teaching of this invention to let the procedure determine the largest M for a given signature such that the M-mismatch probability is less than a given threshold. This approach requires some iterative interaction between this step and the mismatch calculation described previously.

Figure 5:
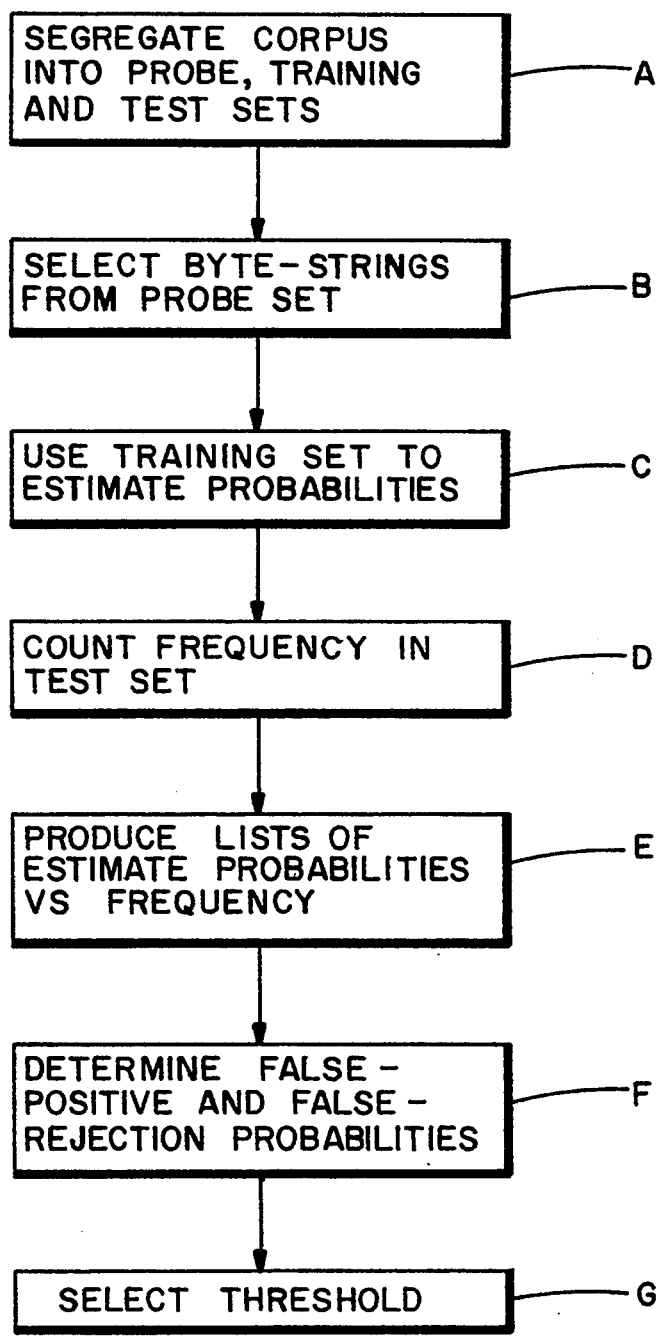
FIG. 5 is a flow chart that depicts a method of selecting a probability threshold used for accepting or rejecting a candidate signature.

If a threshold probability is employed, a presently preferred approach to choosing an appropriate threshold is shown in the flow chart of FIG. 5 and is described as follows. First, at Block A the corpus 34 is segregated into three components: a probe set, a training set, and a test set. This can be done by randomly assigning programs in the corpus 34 to one of the three sets. The probe set may be relatively small; the training and test sets are preferably larger and approximately comparable to one another in size. At Block B the procedure randomly selects several (preferably several thousand or more) byte-strings from the probe set, each of the byte strings having a length comparable to a typical signature length S. Treating just the training set as the corpus, at Block C use the set of procedures described in detail above to estimate exact-match and the typical set of fuzzy-match probabilities for each signature. At Block D, count the frequency of each signature and each of the appropriate fuzzy-matches to that signature in the test set.

At Block E, produce lists of, for each signature in the probe set, the estimated probability (obtained from the training set) vs. the measured relative frequency (obtained from the test set) for exact matches and for all of the desired types of fuzzy matches (e.g. fragments, 1-mismatches, 2-mismatches, etc.). To establish a reasonable probability threshold for each type of match, Block F performs the following calculations. First, for each of many (typically several dozen) closely-spaced probability thresholds T(i), it tallies $S_{bad(T)}$, the total number of signatures with estimated probabilities below T(i) which appeared one or more time in the test set. Next, for each of the specified probability thresholds T(i), it tallies $S_{total(T)}$, the total number of signatures with estimated probabilities below T. The false-positive probability for the threshold T is then given by $$FP(T) = S_{bad(T)}/S_{total(T)}.$$

Then, the total number of signatures $S_{good}$ from the probe set which never appeared in the test set (referred to as "good" signatures) is tallied. Next, for each T, the fraction GoodSigs(T) of "good" signatures with estimated probabilities less than or equal to T is calculated. At Block G there is selected (either automatically using set criteria or by the user) a threshold T for which the false-positive probability FP(T) is acceptably small (typically much less than 1%), but for which the fraction of signatures which are expected to be accepted by the threshold GoodSigs(T) is sufficiently large (i.e. 5% to 25% or more) to virtually guarantee that a valid signature can be found somewhere in the viral code.

To establish a reasonable probability threshold for each type of match, Block F calculates the percentage of signatures, with estimated probabilities below a specified threshold, which appeared in the test set one or more times. This yields the false positive probability for that threshold. At Block G there is selected a threshold which gives an acceptably small false-positive probability, but that does not exclude a significant number of the signatures.

To allow for the fact that the number of programs that exist or could exist exceeds the number of programs in the corpus 34 by a considerable margin, it may be desirable to diminish the threshold probability by a factor of 10 or 100. In practice this may be overly conservative, in that virus code tends to be written in assembler, and not the high-level languages in which most modern software applications are written. Thus, selection of thresholds based upon studies of probes taken from the corpus itself can be overly pessimistic for viruses, which are somewhat atypical software. In practice, even when the safety factor of 10 to 100 is not included, it is rare for the procedures of the invention to produce signatures yielding false positives.

In the evaluation mode, each candidate signature (perhaps modified by the automatic insertion of wildcards in potentially variable byte positions) is reported along with its exact-match, M-mismatch, and fragment probabilities, M itself, and an indication as to whether the signature was accepted as a valid signature.

In the extraction mode, there can be selected for each virus one or more candidate signatures having the best score(s). In this case, it may be desirable for the score to reward larger values of M, so that the chosen signatures capture the greatest possible amount of variation. Regardless of the specific selection criteria details, the same information is reported as was described above for the evaluation mode.

The end result is the generation or acceptance of one or more valid virus signatures if the estimated probability of the occurrence of the candidate virus signature is less than a threshold probability, wherein the threshold probability has a value which is low enough to reject signatures which are likely to produce too many false positives during subsequent use of it by a virus scanner, but high enough to permit at least some candidate signatures to be accepted.

It is noted that there are, in general, separate thresholds for exact match, fragment, and M-mismatch probabilities (different threshold for each M). In order to be accepted for use with a scanner, a signature must have an estimated false positive probability that is less than the threshold. Depending on the nature of the scanner, a signature which satisfies the exact-match threshold, but not the fragment and/or the M-mismatch threshold, can be accepted. For this case, the scanner is informed, using the appropriate format in the signature database, that the fragments and/or mismatches are not to be used for that signature. In the case of mismatches, M can be adjusted such that the estimated false positive probability for M mismatches is below the M-mismatch threshold.

In addition to meeting the threshold, there are other criteria. First, the estimated false positive probability should be among the lowest of all candidate signatures. This criteria may be traded off against the desire to maintain M to be as large as possible.

Furthermore, it may be desirable to bring into play other criteria, such as biasing the selection in favor of signatures which begin with a sufficiently uncommon sequence of bytes.

As an example, the following steps illustrate a presently preferred technique.

1. Discard any candidate signatures for which the first two bytes are more common than a given threshold.
2. Evaluate exact-match probability for all remaining candidate signatures.
3. Discard any candidate signatures with exact-match false positive probabilities which are above the exact-match threshold.
4. Retain the n (n typically about 10–20) candidate signatures having the lowest estimated probabilities.
5. For each remaining candidate signature i, evaluate the fragment false positive probability $frag_i$.
6. For each remaining candidate signature i, also evaluate whether the m-mismatch false positive probability exceeds the m-mismatch threshold. Then set $M_i = m - 1$. The maximal value of $M_i$ is preferably limited to a linear function of the length of the signature S.
7. For all candidate signatures which correspond to a particular virus V, choose the "best" signature as the one with the largest value of M, breaking ties by choosing the signature with the lowest M-mismatch false positive probability.
8. Record the "best" signature for each virus in the signature database, along with the value of M, whether or not the fragment is acceptable (i.e. the fragment false positive probability is below the fragment threshold), and any other appropriate information.

There are a number of possible variations on this technique; that described above being optimized for a particular virus scanner.

As was noted above, the signature report(s) are typically displayed on the display device 20 and/or are written to files on storage media in the appropriate format for use by other software programs, particularly virus scanners.

Having described the method of the invention in the context of the data processing system 10 of FIG. 1, reference is now made to the virus extraction and evaluation system 38 of FIG. 6. The IF 32, corpus 34, and n-gram_table 36 function as in FIG. 1 and are numbered accordingly. An n-gram processor 40 has an input that is connected to a switch 42 and receives either sections of virus code 32a, in the extraction mode, or candidate signatures 32b, in the evaluation mode. The n-gram processor 40 operates in accordance with the procedures Build_Ngram_List (Extraction Mode) and Build_Ngram_List (Evaluation Mode). The block LOS 44 provides the length_of_section information in the Extraction Mode and the length_of_signature information in the Evaluation Mode. It is noted that the LOS 44 is typically an internal variable that is determined from the form of the input 32a or 32b. The block $n_{Max}$ 46 provides a value that is typically in the range of 3–8. The n-gram processor 40 is bidirectionally coupled to the n-gram_table 36 for storing the unique n-grams therein.

Coupled to an output of the n-gram_table 36 is an n-gram probability estimator 48. The estimator 48 operates in accordance with Equations 1 and 2 for either Method 1 or Method 2. When operating in Method 1 the estimator 48 receives n-grams from the table 36 and also byte strings from the corpus of programs 34. When operating in Method 2, the estimator 48 is coupled instead to a table of n-gram probabilities 50. Estimator 48 receives a value for alpha from the block 52 and provides to the n-gram_table 36 the values for f, $T_n$, and p, as described above.

The system 38 also includes a candidate signature probability estimator 54 that operates in accordance with the procedures and equations:
X_Probability_Evaluation_Mode,
X_Probability_Extraction_Mode,
Exact-Match_Probability(signature),
Calculate_Sequence_Probability(byte-sequence;P),
Calculate_Block_Probability(byte-block)-(Equation 3),
Fragment_Probability(signature),
Equation 4, and
Mismatch_Probability(signature;M).

The estimator 54 receives inputs from blocks 56 and 58, the inputs being expressive of the signature length (S) and the number of allowed mismatches (M), respectively. The list Q and other required storage elements are internally maintained by the estimator 54. An output of estimator 54 is coupled to a memory providing storage for a list of candidate signature probabilities 60, and provides the values for $p_{Exact}$, $p_{Fragment}$, and $p_{Mismatch}$ thereto.

Coupled to an output of the list 60 is a probability combiner and valid signature selector 62. Block 62 operates in accordance with Blocks D and E of FIG. 3 and, if required, the flowchart of FIG. 5. Coupled to the combiner and selector block 62 is a threshold block 64. Threshold block 64 provides a current threshold value to the combiner and selector block 62. The output of the combiner and selector 62 is the signature report. This output can be provided to a suitable display device and/or as a file for inputting to, for example, a virus scanner program.

Blocks 70 and 72 are employed for the case where the threshold probability is being determined. Block 70 operates in accordance with Blocks E and F of FIG. 5 and receives inputs from blocks 48, 54 and 72. Block 70 provides an output to block 64. Treating byte sequences taken from the probe set as candidate signatures, and treating the training set as the corpus, block 48 provides the information required by block 54 to calculate probability estimates. These probability estimates are input to block 70. In addition, treating the same byte sequences as candidate signatures and using the test set as the corpus, block 48 tallies the frequency of each "candidate signature" and feeds the frequencies (f) to block 70. At block 70, the probability estimates and the tallied frequencies are combined, as described previously with respect to blocks E and F of FIG. 5, to calculate the false-positive and false-rejection probabilities as a function of the threshold. Block 72 represents, in one embodiment, a heuristic for making a reasonable trade off between the need to minimize both of these quantities. In another embodiment, block 72 represents user interactive input. For this latter embodiment the user is provided a display of false-positive and false-rejection curves and inputs a choice of threshold based on this information. In either case, the threshold is stored in block 64 for use by block 62.

The blocks 40, 48, 54, 62, and 70 can be implemented as separate dedicated processing devices, or by a single processing device that operates in accordance with the method of the invention. The blocks 32, 34, 36, 50, and 60 can be implemented with separate memory devices or with a single memory device, such as a RAM or a disk. Blocks 44, 46, 52, 56, 58, and 64 may be implemented with registers or as locations Within a memory device. The switch 42 is understood to be either a physical switch or a logical switch.

Although the invention has been described above in the context of methods and apparatus for evaluating and extracting signatures of computer viruses and other undesirable software entities, it should be appreciated that the teaching of the invention has a wider application. That is, the teaching of the invention is applicable to applications where objects or events, referred to collectively entities of interest, can be characterized by a number of features. As a matter of efficient recognition, and/or to generalize to a class of related objects or events, a relatively smaller set of features are used to reliably recognize the objects or events. The method of the invention characterizes statistically a large "corpus" of other objects or events which occur typically, and then uses this information to determine signatures for the objects or events to be recognized.

As examples, applications that can benefit from the teaching of this invention include fingerprint recognition, voice print recognition, and retinal print recognition. The teaching of the invention can also be employed to detect plagiarism by, for example, scanning a text file to detect instances of known text sequences. The teaching of this invention can also be employed to detect anomalies in audit records of various types, including logs of activity on a computer network.

Thus, although this invention has been particularly shown and described with respect to preferred embodiments thereof, it will be understood by those skilled in the art that changes in form and details may be made therein without departing from the scope and spirit of the invention.

Having thus described my invention, what I claim as new, and desire to secure by Letters Patent is:

1. A method for operating a digital data processor to obtain one or more valid signatures of an undesirable software entity, the digital data processor including a memory that is bidirectionally coupled to the digital data processor, the method comprising the steps of:
storing in the memory a corpus of computer programs that are representative of computer programs that are likely to be infected by an undesirable software entity;
inputting to the digital data processor at least one portion of the undesirable software entity, the at least one portion including a sequence of bytes of the undesirable software entity that are likely to remain substantially invariant from a first instance of the undesirable software entity to a second instance of the undesirable software entity;
storing the at least one inputted portion in the memory;

selecting at least one candidate signature of the undesirable software entity from the stored at least one portion of the undesirable software entity;

constructing with the digital data processor a list of unique n-grams from the sequence of bytes, each of the unique n-grams being comprised of from one to a chosen maximal number of sequential bytes (B) of the sequence of bytes, the constructed list of unique n-grams being stored in the memory;

for each of the unique n-grams of the stored list, estimating with the digital data processor a probability of an occurrence of the unique n-gram within sequences of bytes obtained from the stored corpus of computer programs;

for each candidate signature that is comprised of one or more of the unique n-grams, estimating with the digital data processor a false-positive probability of an occurrence of the candidate signature within the sequences of bytes obtained from the corpus of computer programs;

comparing the estimated false-positive probabilities of the candidate signatures with one another and with a set threshold probabilities, the threshold probabilities having values selected to reduce a likelihood of an occurrence of a false positive indication during the use of a signature; and outputting at least one signature for subsequent use in identifying an occurrence of the undesirable software entity or a modified version of the undesirable software entity, the outputted at least one signature being determined to exhibit a false alarm probability that is comparable to or less than a lowest false alarm probability of others of the candidate signatures.

2. A method as set forth in claim 1 wherein the step of inputting includes a step of inputting one or more undesirable software entity signatures, each of the one or more undesirable software entity signatures including at least one portion of the undesirable software entity, the at least one portion including a sequence of bytes that is unlikely to vary from a first instance of the undesirable software entity to a second instance of the undesirable software entity.

3. A method as set forth in claim 1 wherein the step of inputting includes the initial steps of:
   obtaining at least one instance of the undesirable software entity; and
   evaluating the at least one instance to identify at least one portion that is likely to remain substantially invariant from a first instance of the undesirable software entity to a second instance of the undesirable software entity.

4. A method as set forth in claim 3 and, in the event that the undesirable software entity is self-replicating, the method includes a further step of attempting to generate other copies of the undesirable software entity.

5. A method as set forth in claim 1 wherein the step of estimating a probability of an occurrence of a unique n-gram includes a step of recording a frequency of occurrence of the n-gram within the sequences of bytes obtained from the corpus of computer programs.

6. A method as set forth in claim 5 wherein for uni-grams (n=1), the estimated probability is given by the recorded frequency divided by the total number of uni-grams; and for n-grams (n≧2) the estimated probability is given by a weighted average of the recorded frequency and a probability determined by combining together shorter n-grams.

7. A method as set forth in claim 6 wherein two (n-1)-gram probabilities and an (n-2)-gram probability are combined to form an n-gram probability (p) in accordance with the expression:

$$p(B_1B_2 \ldots B_n) = \frac{p(B_1B_2 \ldots B_{n-1})p(B_2B_3 \ldots B_n)}{p(B_2B_3 \ldots B_{n-1})},$$

where $B_1$ to $B_n$ are sequentially occurring bytes.

8. A method as set forth in claim 1 wherein the step of estimating a probability of an occurrence of a unique n-gram includes a step of looking up an n-gram within a predetermined table of probabilities of the occurrence of the n-gram within the sequences of bytes obtained from the corpus of computer programs.

9. A method as set forth in claim 1 wherein the step of estimating a probability of an occurrence of the candidate signature includes the step of estimating a probability of an exact match between the candidate signature and the sequences of bytes obtained from the corpus of computer programs.

10. A method as set forth in claim 9 wherein the step of estimating a probability of an exact match includes an initial step of replacing bytes that may potentially vary, from the first instance of the undesirable software entity to the second instance, with a wildcard byte that has an exact match with every possible byte.

11. A method as set forth in claim 10 wherein the step of estimating a probability of an exact match includes a second initial step of segregating the candidate signature into a plurality of contiguous blocks of bytes each of which contains no wildcard bytes, and wherein the exact match probability is found by multiplying together probabilities of each of the segregated plurality of contiguous blocks of bytes.

12. A method as set forth in claim 1 wherein the step of estimating a false-positive probability of an occurrence of the candidate signature includes the step of estimating a probability of a partial match between the candidate signature and the sequences of bytes obtained from the corpus of computer programs.

13. A method as set forth in claim 12 wherein the step of estimating a probability of a partial match includes an initial step of replacing bytes that may potentially vary, from the first instance of the undesirable software entity to the second instance, with a wildcard byte that has an exact match with every byte in the sequences of bytes obtained from the corpus of computer programs.

14. A method as set forth in claim 12 wherein the step of estimating a probability of an occurrence of the partial match includes the step of estimating a probability of a fragment of the candidate signature matching the sequences of bytes obtained from the corpus of computer programs.

15. A method as set forth in claim 12 wherein the step of estimating a probability of an occurrence of the partial match includes the step of estimating a probability of at most M bytes of a sequence of bytes obtained from the corpus of computer programs not matching a byte in a corresponding position of the candidate signature.

16. A method as set forth in claim 1 and including the steps of:
   segregating the corpus into a probe set, a training set and a test set;
   selecting byte-strings from the probe set as candidate signatures;

evaluating the byte-strings against the training set to determine exact-match and fuzzy-match probabilities;

determining a frequency of occurrence of the candidate signatures within the test set, including fuzzy-matches of the signatures within the test set;

for each candidate signature, producing lists of an estimated probability of occurrence within the training set and a determined frequency of occurrence of exact-matches and fuzzy-matches within the test set; and determining the set of threshold probabilities in accordance with a criteria that provides an acceptable false-positive probability while not excluding a significant number of the candidate signatures.

17. A method as set forth in claim 1 wherein the step of estimating a probability of an occurrence of the candidate virus signature includes the steps of:

estimating a first probability of an exact match between the candidate signature and the sequences of bytes obtained from the corpus of computer programs;

estimating a second probability of a fragment of the candidate signature matching the sequences of bytes obtained from the corpus of computer programs;

estimating a third probability of at most M bytes of a sequence of bytes obtained from the corpus of computer programs not matching a byte in a corresponding position of the candidate signature;

combining the first, second, and third probability estimates to arrive at a final probability estimate; and comparing the final probability estimate to the threshold probability.

18. A method as set forth in claim 17 and further comprising a step of reporting an identity of a valid signature.

19. A method as set forth in claim 18 wherein the step of reporting includes the steps of reporting values of the first, second, and third probabilities.

20. Apparatus for obtaining a valid signature of an undesirable software entity, comprising:

a memory for storing a corpus of computer programs that are representative of computer programs that are likely to be infected by an undesirable software entity;

means for inputting and for storing in the memory at least one portion of an undesirable software entity, the at least one portion including a sequence of bytes of the undesirable software entity that is likely to remain substantially invariant from a first instance of the undesirable software entity to a second instance of the undesirable software entity;

a first circuit for selecting at least one candidate signature of the undesirable software entity from the at least one portion of the undesirable software entity that is likely to remain substantially invariant, said first circuit including means for accessing the stored at least one portion of the undesirable software entity to identify the sequence of bytes of the undesirable software entity that are likely to remain substantially invariant;

a second circuit for constructing a list of unique n-grams, each of the unique n-grams being comprised of from one to n sequential bytes of the sequence of bytes;

a third circuit for estimating, for each of the unique n-grams, a probability of an occurrence of a unique n-gram within sequences of bytes obtained from said stored corpus of computer programs;

a fourth circuit for estimating, for each candidate signature that is comprised of one or more of the unique n-grams, a probability of an occurrence of the candidate signature within the sequences of bytes obtained from the corpus of computer programs;

a fifth circuit for comparing candidate signatures with one another and with a set threshold probabilities, the threshold probabilities having a value selected to reduce a likelihood of an occurrence of a false positive indication during the use of a signature; and circuit means for outputting at least one signature for subsequent use in identifying an occurrence of the undesirable software entity or a modified version of the undesirable software entity, the outputted at least one signature being determined to exhibit a false alarm probability that is comparable to or less than a lowest false alarm probability of others of the candidate signatures.

21. Apparatus as set forth in claim 20 wherein the means for inputting and storing inputs and stores one or more candidate signatures, each of the one or more candidate signatures including at least one portion of the undesirable software entity, the at least one portion including a sequence of bytes that includes machine code instructions of the undesirable software entity.

22. Apparatus as set forth in claim 20 wherein the inputting means is coupled to an output of means for generating at least one instance of the undesirable software entity; and wherein said accessing means includes a circuit for evaluating the at least one instance to identify at least one portion that is likely to remain substantially invariant from a first instance of the undesirable software entity to a second instance of the undesirable software entity.

23. Apparatus as set forth in claim 20 wherein said third circuit for estimating a probability of an occurrence of a unique n-gram is coupled to said memory having stored therein a predetermined table of probabilities of the occurrence of an n-gram within the sequences of bytes obtained from the corpus of computer programs.

24. Apparatus as set forth in claim 20 wherein said fourth circuit for estimating a probability of an occurrence of the candidate signature includes:

a circuit for estimating a first probability of an exact match between the candidate signature and the sequences of bytes obtained from the corpus of computer programs;

a circuit for estimating a second probability of a fragment of the candidate signature matching the sequences of bytes obtained from the corpus of computer programs;

a circuit for estimating a third probability of at most M bytes of a sequence of bytes obtained from the corpus of computer programs not matching a byte in a corresponding position of the candidate signature; and further comprising a circuit for combining the first, second, and third probability estimates to arrive at a final probability estimate; and a circuit for comparing the final probability estimate to the threshold probability.

25. Apparatus as set forth in claim 24 wherein said combining and comparing circuits have an output for reporting an identity of a valid signature and for reporting the values of the first, second, and third probabilities associated with the valid signature.

26. A method for operating a digital data processor to obtain one or more valid signatures of an undesirable software entity, the digital data processor including a memory that is bidirectionally coupled to the digital data processor, the method comprising the steps of:

- storing in the memory a corpus of computer programs that are representative of computer programs that are likely to be infected by an undesirable software entity;
- inputting to the digital data processor at least one portion of the undesirable software entity, the at least one portion including a sequence of bytes of the undesirable software entity that are likely to remain substantially invariant from a first instance of the undesirable software entity to a second instance of the undesirable software entity;
- storing the at least one inputted portion in the memory;
- selecting at least one candidate signature of the undesirable software entity from the stored at least one portion of the undesirable software entity;
- constructing with the digital data processor a list of unique n-grams from the sequence of bytes, the constructed list being stored in the memory;
- for each of the unique n-grams of the stored list, estimating with the digital data processor a probability of an occurrence of the unique n-gram within sequences of bytes obtained from the stored corpus of computer programs;
- for each candidate signature that is comprised of one or more of the unique n-grams, estimating with the digital data processor a false-positive probability of an occurrence of the candidate signature within the sequences of bytes obtained from the corpus of computer programs; and
- comparing the estimated false-positive probabilities of the candidate signatures with one another and with a set of threshold probabilities, the threshold probabilities having values selected to reduce a likelihood of an occurrence of a false positive indication during the use of any signature with a false-positive probability less than the threshold, the step of comparing including the steps of,
- discarding any candidate signatures for which an occurrence of a predetermined number of selected bytes is more common than a predetermined threshold;
- evaluating an exact-match probability for all remaining candidate signatures;
- discarding any candidate signatures having an exact-match false positive probability that is above an exact-match threshold;
- retaining n candidate signatures having the lowest estimated probabilities;
- for each remaining candidate signature i, evaluating a fragment false positive probability $frag_i$;
- for each remaining candidate signature i, also evaluating an m-mismatch false positive probability, starting with m=1, and incrementing m until the false positive probability exceeds an m-mismatch threshold;
- setting $M_i = m - 1$;
- for all candidate signatures that correspond to a particular undesirable software entity, choosing as a best signature the signature having a largest value of M; and
- recording a chosen best signature for each undesirable software entity in a signature database for subsequent use in identifying an occurrence of the undesirable software entity or a modified version of the undesirable software entity.

27. A method as set forth in claim 26 wherein, during the execution of the step of evaluating a $m_{mismatch}$ false positive probability, the maximal value of $M_i$ is limited to a linear function of a length of the signature.

28. A method as set forth in claim 26 wherein the step of choosing includes a step of breaking ties by choosing a signature having a lowest $m_{mismatch}$ false positive probability.

29. A method as set forth in claim 26 wherein the step of recording includes a step of also recording the value of M within the signature database.

30. A method as set forth in claim 26 wherein the step of recording includes a step of also recording in the signature database fragment matches that are to be permitted.

31. A method for operating a digital data processor to obtain one or more valid signatures of an entity of interest, the digital data processor including a memory that is bidirectionally coupled to the digital data processor, the method comprising the steps of:

- storing in the memory a corpus of digital information that is representative of digital information with which the entity is likely to be found to be associated with;
- inputting to the digital data processor at least one portion of a digitally encoded representation of an entity of interest, the at least one portion being likely to remain substantially invariant from a first instance of the entity of interest to a second instance of the entity of interest;
- storing the at least one inputted portion in the memory;
- selecting at least one candidate signature of the entity of interest from the at least one portion of the representation of the entity of interest, each candidate signature including a subset of the representation of the entity of interest;
- constructing with the digital data processor a list of signature components which can be combined to form a candidate signature, each signature component of the list being distinguishable from other signature components of the list and being comprised of at least one byte of data;
- storing the list of signature components in the memory;
- for each of the stored signature components, estimating with the digital data processor a probability of an occurrence of the signature component within the stored corpus of digital information;
- for each candidate signature that includes one or more of the signature components, estimating with the digital data processor a false-positive probability of an exact occurrence or an approximate occurrence of the candidate signature within a set of digital information that is statistically similar to the corpus of digital information;
- comparing the estimated false-positive probabilities of the candidate signatures with one another and with a set of threshold probabilities, the threshold probabilities having values selected to reduce a likelihood of an occurrence of a false positive indication during the use of any signature having a false-positive probability that is less than the threshold; and outputting at least one signature for subsequent use in identifying an occurrence of the entity of interest or an occurrence of a modified version of the entity of interest, the outputted at least one signature being determined to exhibit a false alarm probability that is comparable to or less than a lowest false alarm probability of others of the candidate signatures.

32. A method as set forth in claim 31 wherein the step of comparing includes the step of selecting as valid signatures one or more candidate signatures having false-positive probabilities that are less than threshold values and which are among the lowest of all the candidate signatures.

33. A method for operating a digital data processor to validate a signature of an undesirable software entity, the digital data processor including a memory that is bidirectionally coupled to the digital data processor, the method comprising the steps of:

storing in the memory a corpus of computer programs that are representative of computer programs that are likely to be infected by an undesirable software entity;

inputting to the digital data processor at least one candidate signature of the undesirable software entity, the at least one candidate signature including a sequence of bytes of the undesirable software entity that are likely to remain substantially invariant from a first instance of the undesirable software entity to a second instance of the undesirable software entity;

storing the at least one inputted portion in the memory;

constructing with the digital data processor a list of unique n-grams from the sequence of bytes, each of the unique n-grams being comprised of from one to a chosen maximal number of sequential bytes (B) of the sequence of bytes, the constructed list of unique n-grams being stored in the memory;

for each of the unique n-grams of the stored list, estimating with the digital data processor a probability of an occurrence of a unique n-gram within sequences of bytes obtained from the stored corpus of computer programs;

for each candidate signature that is comprised of one or more of the unique n-grams, estimating with the digital data processor a probability of an occurrence of the candidate signature within the sequences of bytes obtained from the corpus of computer programs;

comparing the candidate signature with at least one threshold probability having a value selected to reduce a likelihood of an occurrence of a false positive indication during the use of the signature;

accepting or rejecting the candidate signature as a result of the execution of the step of comparing; and outputting at least one accepted signature for subsequent use in identifying an occurrence of the undesirable software entity or a modified version of the undesirable software entity, the outputted at least one accepted signature being determined to exhibit a false alarm probability that is comparable to or less than a lowest false alarm probability of others of the candidate signatures.

34. A method for operating a digital data processor to determine threshold probabilities against which candidate signatures of undesirable software entities are compared, the digital data processor including a memory that is bidirectionally coupled to the digital data processor, the method comprising the steps of:

providing a corpus of computer programs that are stored in the memory;

segregating the stored corpus of computer programs into a probe set, a training set and a test set;

selecting byte-strings from the probe set as candidate signatures;

evaluating the selected byte-strings against byte-strings found in the training set to determine exact-match and fuzzy-match probabilities;

determining a frequency of occurrence of the candidate signatures within the test set, including fuzzy-matches of the signatures within the test set;

for each candidate signature, producing lists for indicating an estimated probability of an occurrence of the candidate signature within the training set and a determined frequency of occurrence of exact-matches and fuzzy-matches within the test set;

determining a set of threshold probabilities in accordance with a criteria that provides an acceptable false-positive probability while not excluding a significant number of the candidate signatures; and outputting at least one signature for subsequent use in identifying an occurrence of the undesirable software entity or a modified version of the undesirable software entity, the outputted at least one signature being determined to exhibit a false alarm probability that is comparable to or less than a lowest false alarm probability of others of the candidate signatures.

* * * * *